(12) United States Patent
Iwaki (10) Patent No.: US 7,119,923 B1
(45) Date of Patent: Oct. 10, 2006

(54) APPARATUS AND METHOD FOR IMAGE PROCESSING

(75) Inventor: Yasuharu Iwaki, Kanagwa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 765 days.

(21) Appl. No.: 09/624,161

(22) Filed: Jul. 24, 2000

(30) Foreign Application Priority Data

Jul. 23, 1999 (JP) .................................. 11-209768

(51) Int. Cl.
G06F 15/00 (2006.01)
G03F 3/08 (2006.01)

(52) U.S. Cl. ........................................ 358/1.9; 358/518
(58) Field of Classification Search ................. 358/1.9, 358/518, 1.15, 527, 504, 506, 523, 531, 537; 382/162; 716/4; 399/76; 345/22, 90

See application file for complete search history.

(56) References Cited

U.S. PATENT DOCUMENTS

| | | | | | |
|---|---|---|---|---|---|
| 4,646,252 | A | * | 2/1987 | Terashita | 382/141 |
| 4,878,843 | A | * | 11/1989 | Kuch | 434/112 |
| 4,991,007 | A | * | 2/1991 | Corley | 348/188 |
| 5,099,276 | A | * | 3/1992 | Kagosaki | 355/70 |
| 5,111,301 | A | * | 5/1992 | Haruki et al. | 348/364 |
| 5,144,446 | A | * | 9/1992 | Sudo et al. | 358/213.11 |
| 5,181,098 | A | * | 1/1993 | Guerin et al. | 348/187 |
| 5,255,083 | A | * | 10/1993 | Capitant et al. | 358/527 |
| 5,408,342 | A | * | 4/1995 | Kumada et al. | 358/518 |
| 5,475,509 | A | * | 12/1995 | Okamoto | 358/518 |
| 5,606,365 | A | * | 2/1997 | Maurinus et al. | 348/222.1 |
| 5,739,922 | A | * | 4/1998 | Matama | 358/447 |
| 5,748,336 | A | * | 5/1998 | Kakutani | 382/252 |
| 5,748,858 | A | * | 5/1998 | Ohtsuka et al. | 358/1.9 |
| 5,978,100 | A | * | 11/1999 | Kinjo | 358/453 |
| 6,042,257 | A | * | 3/2000 | Tsudaka | 700/121 |
| 6,050,731 | A | * | 4/2000 | Matsui | 400/74 |
| 6,061,526 | A | * | 5/2000 | Deguchi et al. | 396/89 |
| 6,067,375 | A | * | 5/2000 | Tsudaka | 382/144 |
| 6,115,506 | A | * | 9/2000 | Koshinaka | 382/290 |
| 6,151,464 | A | * | 11/2000 | Nakamura et al. | 399/79 |
| 6,222,613 | B1 | * | 4/2001 | Haraguchi et al. | 355/40 |
| 6,313,902 | B1 | * | 11/2001 | Enomoto | 355/18 |
| 6,343,161 | B1 | * | 1/2002 | Uchida | 382/309 |
| 6,404,936 | B1 | * | 6/2002 | Katayama et al. | 382/283 |
| 6,442,293 | B1 | * | 8/2002 | Ito et al. | 382/154 |
| 6,459,500 | B1 | * | 10/2002 | Takaoka | 358/1.9 |
| 6,466,262 | B1 | * | 10/2002 | Miyatake et al. | 348/218 |
| 6,473,198 | B1 | * | 10/2002 | Matama | 358/1.9 |
| 6,476,394 | B1 | * | 11/2002 | Amitani et al. | 250/368 |
| 6,542,633 | B1 | * | 4/2003 | Kori | 382/167 |
| 6,577,751 | B1 | * | 6/2003 | Yamamoto | 382/117 |

(Continued)

Primary Examiner—Madeleine A V Nguyen
(74) Attorney, Agent, or Firm—Sughrue Mion, PLLC (57) ABSTRACT

There is provided an image processing apparatus including an image correcting amount computing unit for computing a proper amount of image correction based on image data of an image of an original delivered from an image input unit; an image processing unit for performing image processing based on the thus computed proper amount of image correction; and a display unit for displaying for monitoring a processed image. The proper amount of image correction automatically computed by the image correcting amount computing unit is evaluated for a degree of correctness and a warning is given when the degree of correctness is low. The image processing method which is implemented in the above apparatus is also provided. Images having a possibility of being erroneously identified during image processing are subjected to operator's judgment whereby outputting of defective prints can be reduced.

21 Claims, 4 Drawing Sheets

U.S. PATENT DOCUMENTS

| | | | |
|---|---|---|---|
| RE38,180 E * | 7/2003 | Edge | 347/19 |
| 6,600,548 B1 * | 7/2003 | Enomoto | 355/40 |
| 6,630,958 B1 * | 10/2003 | Tanaka et al. | 348/333.06 |
| 6,631,208 B1 * | 10/2003 | Kinjo et al. | 382/167 |
| 6,639,690 B1 * | 10/2003 | Yamazaki | 358/1.16 |
| 6,683,643 B1 * | 1/2004 | Takayama et al. | 348/247 |
| 6,813,043 B1 * | 11/2004 | Mizuyama et al. | 358/3.03 |
| 6,831,755 B1 * | 12/2004 | Narushima et al. | 358/1.9 |
| 6,898,312 B1 * | 5/2005 | Schroder | 382/167 |
| 2001/0017645 A1 * | 8/2001 | Toda | 347/116 |
| 2002/0054354 A1 * | 5/2002 | Fukao | 358/3.04 |

* cited by examiner

APPARATUS AND METHOD FOR IMAGE PROCESSING

BACKGROUND OF THE INVENTION

This invention relates to an apparatus and a method for image processing. More specifically, the invention relates to an apparatus and a method for image processing in which an image having a strong possibility of failing in computing a proper amount of image correction in an image correcting amount computing unit, such as an image belonging to a group that contains images taken with unusual types of light sources and images having a color failure, or a group that contains images taken with backlight and images taken with an electronic flash is subjected to an operator's judgment.

Heretofore, images recorded on photographic films such as negative and reversal films (which are hereunder referred to simply as "films") have been commonly printed on light-sensitive materials (photographic papers) by means of direct (analog) exposure in which the film images are projected onto the light-sensitive materials to achieve their areal exposure.

A new technology has recently been introduced and this is a printer that relies upon digital exposure. Briefly, an image recorded on a film is read photoelectrically, converted to digital signals and subjected to various image processing steps to produce image data for recording purposes; recording light that has been modulated in accordance with the image data is used to scan and expose a light-sensitive material to record a latent image, which is subsequently developed to produce a finished print (photograph). The printer operating on this principle has been commercialized as a digital photoprinter.

In the digital photoprinter, the image is converted to digital image data which is processed to determine exposing conditions for printing. Hence, the digital photoprinter is capable of performing effective image processing operations such as the correction of washed-out highlights or flat shadows due to photography with backlight or an electronic flash, sharpening and the correction of color or density failure and this enables the production of high-quality prints that have been impossible to attain by the conventional direct exposure technique. What is more, by image data processing, a plurality of images can be assembled into one composite image or a single image can be divided into more than one image and even characters can be assembled; thus, prints can be output after editing/processing is done in accordance with a specific use.

Outputting images as prints is not the sole capability of the digital photoprinter; the image data can be supplied into a computer or the like and stored in recording media such as a floppy disk; hence, the image data can be put to various non-photographic uses.

Having these features, the digital photoprinter is basically composed of an image input machine having a scanner (image reading apparatus) that reads an image on a film photoelectrically and an image processing apparatus that processes the image read with the scanner to produce output image data (exposing conditions) as well as an image output machine having a printer (image recording apparatus) that scan exposes a light-sensitive material in accordance with the image data output from the image input machine to record a latent image and a light-sensitive material processor (developing apparatus) that performs development and other necessary processing on the exposed material to produce a print.

In the scanner, reading light issuing from a light source is allowed to be incident on the film, from which projected light bearing the image recorded on the film is produced and focused by an imaging lens to form a sharp image on an image sensor such as a CCD sensor; the image is then read by photoelectric conversion and sent to the image processing apparatus as image data of the image on the film (i.e., image data signals) after being optionally subjected to various image processing steps.

In the image processing apparatus, image processing conditions are set on the basis of the image data read with the scanner and image processing as determined by the thus set conditions is performed on the read image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Development and other processing as determined by the light-sensitive material are then performed in the processor to produce a print reproducing the image that was recorded on the film.

It is empirically known that the transmittances of three colors R, G and B are approximately equal to each other for an image recorded on a correctly exposed film, and that an approximately correct print is obtained by performing image correction so that the average value thereof is approximately equal to a specified value (Evans' principle).

However, scenes taken under unusual types of light sources including a fluorescent lamp and a tungsten lamp, or color failure scenes in which highly saturated colors occupy a large area in the background such as lawn, blue sky or sea do not meet the assumption of the transmittances of three colors R, G and B as mentioned above. Further, in the scene taken with backlight or an electronic flash, the luminance is significantly different between the principle subject and the background. Therefore, the approximately correct print cannot be obtained by the corrective control of the image based on the average value.

To solve this problem, various methods have been proposed to identify these scenes by analyzing the images recorded on a film. However, the conventional methods have not so far attained complete identification of these scenes.

Also in the photoprinter having the layout and functions as mentioned above, image processing function was primarily improved, which enabled production of preferable prints by performing effective correction for most of images on a film. For the particular images as mentioned above however, output prints obtained were often based on erroneous image processing.

Film images that may be subjected to the erroneous image processing in the digital photoprinter include those taken under unusual types of light sources including the above-mentioned fluorescent lamp and tungsten lamp, which are erroneously identified as those having color failure. Both the images have extremely deviated color balance, hence the identification thereof is difficult. The erroneous identification leads to the reversion of the direction in which the correction is performed.

Another example is an image taken with backlight, which is erroneously identified as an image taken with an electronic flash. Extremely high contrast is the feature of both the images. In this case, erroneous identification also leads to the reversion of the direction in which the correction is performed.

SUMMARY OF THE INVENTION

Under the circumstances, an object of the present invention is to solve the prior art problems by providing an image processing apparatus in which images having a possibility of being erroneously identified during image processing are subjected to operator's judgment whereby outputting of images reproduced by erroneous image processing including defective prints can be reduced.

Another object of the present invention is to provide an image processing method that is implemented in the image processing apparatus mentioned above.

Images of a type that is likely to be identified erroneously in the image processing as mentioned above are herein referred to as "failure images", which can be easily identified even by an operator that is not particularly skilled, but are often erroneously identified in the image processing function having average performance.

In order to attain the above object, the present invention provides an image processing apparatus, comprising: an image correcting amount computing unit for computing a proper amount of image correction based on image data of an image of an original delivered from an image input unit by which the image data of the image of the original was input; an image processing unit for performing image processing based on the proper amount of image correction computed by the image correcting amount computing unit to thereby produce a processed image; and a display unit for displaying for monitoring the processed image obtained by the image processing unit; wherein the proper amount of image correction automatically computed by the image correcting amount computing unit is evaluated for a degree of correctness and a warning is given when the degree of correctness is low.

The present invention provides an image processing apparatus, comprising: an image correcting amount computing unit for computing a proper amount of image correction based on image data of an image of an original delivered from an image input unit by which the image data of the image of the original was input by photoelectrically reading the image of the original, or reading out from a digital camera or an image data recording medium, or downloading via communication lines; an image processing unit for performing image processing based on the proper amount of image correction computed by the image correcting amount computing unit to thereby produce a processed image; a display unit for displaying for monitoring the processed image obtained by the image processing unit; and a verifying unit in which an operator performs an input operation for verifying an image belonging to a group of images in which correction is performed in different directions for the proper amount of image correction automatically computed by the image correcting amount computing unit.

Preferably, the image input unit is an image reading unit for photoelectrically reading the image of the original as the image data, a readout unit for reading out the image data from a digital camera or an image data recording medium, or a communication unit for downloading the image data via communication lines.

It is preferable that an image for which the warning is given because of the low degree of correctness in the proper amount of image correction automatically computed by the image correcting amount computing unit, belongs to a group of images in which correction is performed in different directions for the proper amount of image correction, and that the image processing apparatus further includes: a verification unit in which an operator performs an input operation for verifying the image belonging to the group of the images in which the correction is performed in the different directions for the proper amount of image correction.

Preferably, the image for which the correction is performed in the different directions for the proper amount of image correction is a failure image and the group of the images in which the correction is performed in the different directions for the proper amount of image correction is a group that contains images taken with unusual types of light sources and images having a color failure, and a group that contains images taken with backlight and images taken with an electronic flash.

Preferably, images other than the image for which the warning is given because of the low degree of correctness in the proper amount of image correction, or images other than the failure image are not displayed on a verification screen in the display unit.

Preferably, for the image for which the warning is given because of the low degree of correctness in the proper amount of image correction, or the failure image, each image resulting from the image processing performed based on the proper amount of image correction in each of at least two of the different directions is displayed on the display unit to ask for the operator's instruction for selection.

It is also preferable that the image processing apparatus further includes: an image storage unit for storing images for which the warning is given because of the low degree of correctness in the proper amount of image correction, or failure images, so that a batch of the images for which the warning is given because of the low degree of correctness in the proper amount of image correction, or the failure images can be verified.

It is further preferable that the image processing apparatus further includes: a unit for storing the processed image obtained by the image processing unit as the image data.

It is still further preferable that the image processing apparatus further includes: a unit for outputting the processed image obtained by the image processing unit to an external unit as the image data.

In order to attain the another object described above, the present invention provides an image processing method, comprising the steps of: computing a proper amount of image correction based on image data of an image of an original input by photoelectrically reading the image of the original, reading out from a digital camera or an image data recording medium, or downloading via communication lines; performing image processing based on the thus computed proper amount of image correction; and outputting a processed image based on results of the image processing; wherein the proper amount of image correction automatically computed in the step of computing the proper amount of image correction is evaluated for a degree of correctness and a warning is given when the degree of correctness is low.

The present invention provides an image processing method, comprising the steps of: computing a proper amount of image correction based on image data of an image of an original input by photoelectrically reading the image of the original, reading out from a digital camera or an image data recording medium, or downloading via communication lines; performing image processing based on the thus computed proper amount of image correction; and outputting a processed image based on results of the image processing;

wherein an image belonging to a group of images in which correction is performed in different directions for the proper amount of image correction obtained in the step of computing the amount of image correction is identified and displayed on a display unit to ask for an operator's input instruction.

Preferably, the image for which the correction is performed in the different directions for the proper amount of image correction is a failure image and the group of the images in which the correction is performed in the different directions for the proper amount of image correction is a group that contains images taken with unusual types of light sources and images having a color failure, and a group that contains images taken with backlight and images taken with an electronic flash.

DETAILED DESCRIPTION OF THE INVENTION

The image processing apparatus and method of the invention are now described in detail with reference to the preferred embodiments shown in the accompanying drawings.

Figure 1:
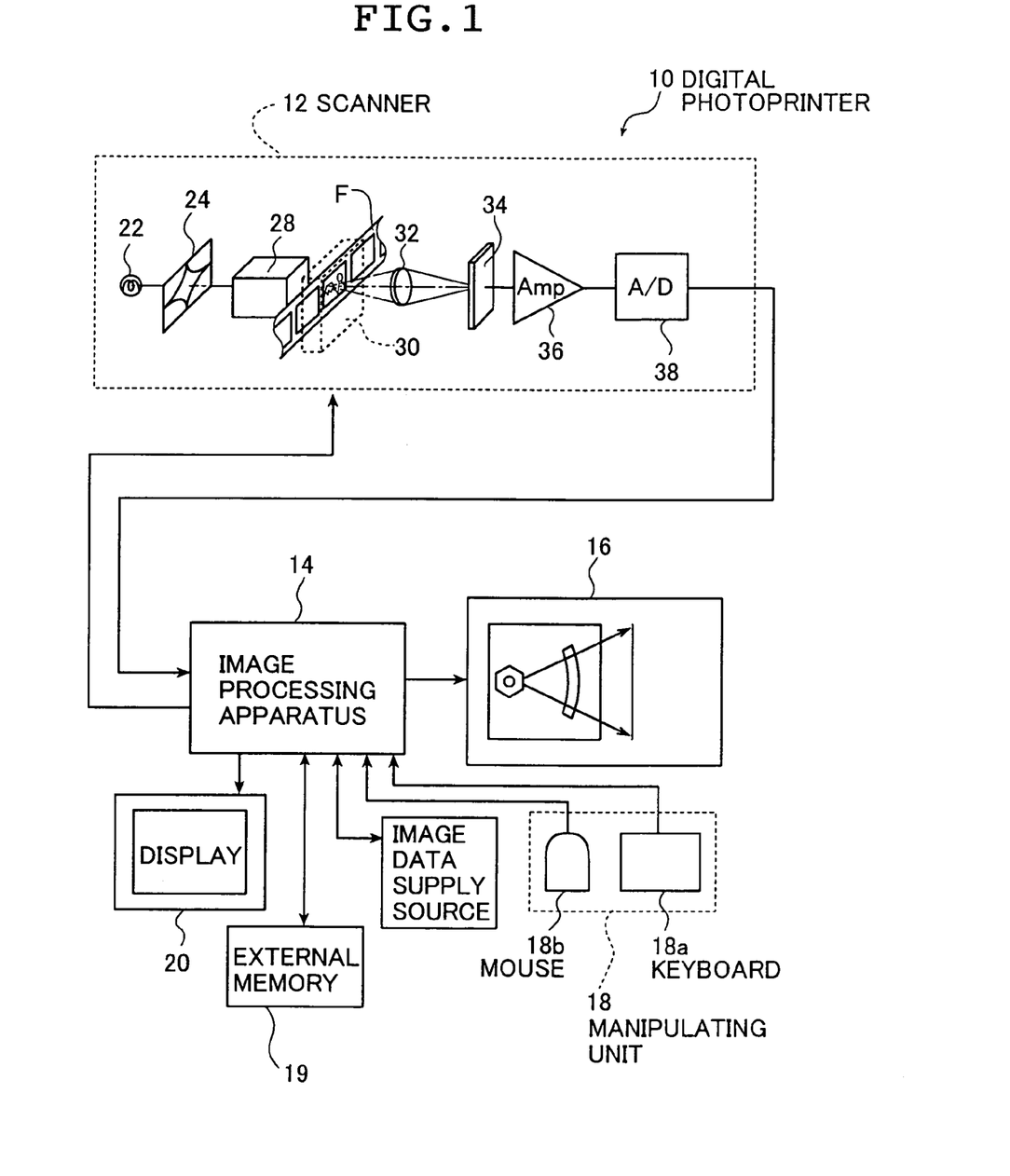
FIG. 1 is a block diagram showing the layout of an exemplary photoprinter to which the image processing apparatus according to an embodiment of the invention for implementing the image processing method of the invention is applied.

FIG. 1 is a block diagram showing the layout of an exemplary digital photoprinter to which the image processing apparatus according to an embodiment of the invention for implementing the image processing method of the invention is applied. The digital photoprinter (which is hereinafter referred to simply as "photoprinter") 10 shown in FIG. 1 basically comprises a scanner (image reading apparatus) 12 for photoelectrically reading the image recorded on a film F, an image processing apparatus 14 which performs image processing on the image data (image information) read with the scanner 12 and implements the image processing method of the invention and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a finished print (which is hereinafter referred to simply as "print").

Connected to the image processing apparatus 14 are a manipulating unit 18 including a keyboard 18a and a mouse 18b for inputting or setting various conditions, selecting and commanding a specific processing step and entering a command and so forth for effecting color/density correction, as well as a display 20 that represents the image read with the scanner 12, various manipulative commands and pictures for setting and registering various conditions, and that constitutes the display unit of the invention.

In addition to the scanner 12 constituting an image input unit, an image data supply source 21 that optionally constitutes another image input unit in the present invention may be also connected to the image processing apparatus 14, as mentioned below.

The scanner 12 constitutes the image reading unit used as an image input unit according to the invention. The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36, and an analog/digital (A/D) converter 38.

In the photoprinter 10, dedicated film carriers 30 are available that can be loaded into the housing of the scanner 12 in accordance with the type or size of the film used (e.g. whether it is a film of the Advanced Photo System (APS) or a negative or reversal film of 135 size), the format of the film (e.g. whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carrier 30.

The scanner 12 reads or captures the image recorded on the film F in the following manner; the reading light from the light source 22 has its quantity adjusted by means of the variable diaphragm 24 and is incident on the film F held in the specified reading position by means of the carrier 30 and thereafter passes through the film F to produce projected light bearing the image recorded on the film F.

The illustrated carrier 30 is adapted for the film F of the APS (or cartridge thereof). As shown schematically in FIG. 2A, the carrier 30 has two transport roller pairs 30a and 30b and a mask 40 having a slit 40a. The transport roller pairs 30a and 30b set the film F in the specified reading position and are provided on opposite sides of the reading position in an auxiliary scanning direction which is perpendicular to the main scanning direction (i.e., the direction in which the line CCD sensors in the image sensor 34 extend) and they transport the film F with its length being parallel to the auxiliary scanning direction. The slit 40a defines the projected light from the film F to have a specified narrow shape, is in registry with the reading position and extends in the main scanning direction.

Figure 2A:
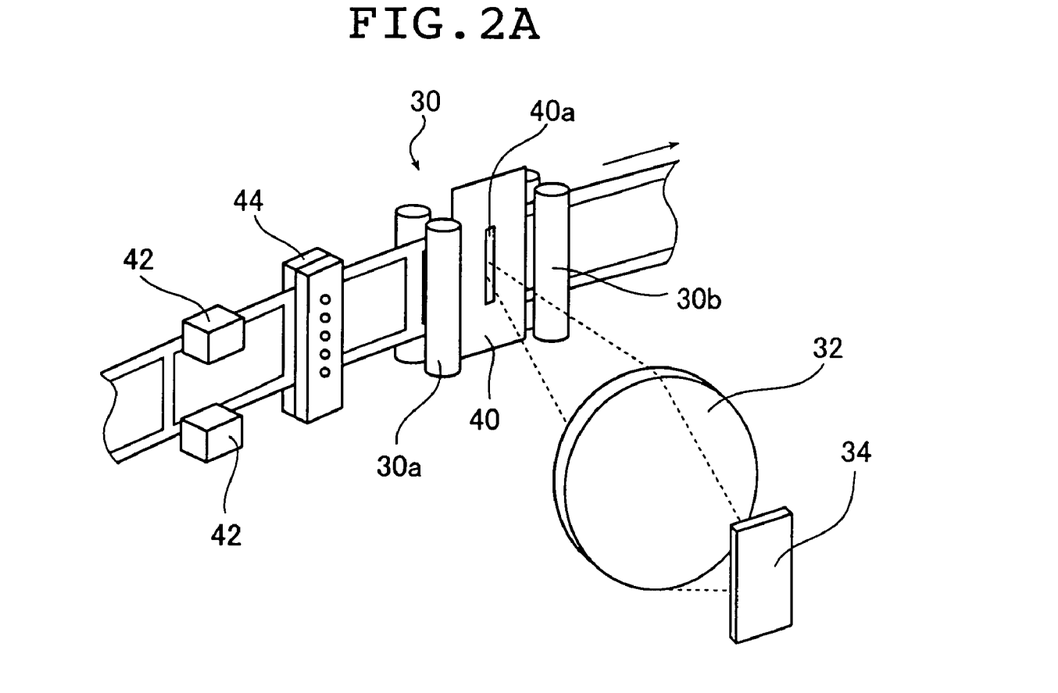
FIG. 2A is a perspective view that shows diagrammatically a carrier to be mounted on the photoprinter shown in FIG. 1.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

As is well known, magnetic recording media are preliminarily formed on an APS film to record various kinds of information. In addition, a camera, a developing machine and the carrier 30 are provided with a device for recording and reading the magnetic information, which writes various kinds of information on the magnetic recording media or reads the stored information.

Further, films other than usual 135-size films and APS films also have bar codes recorded thereon, as exemplified by a DX code, an expanded DX code, a FNS code and the like, which represent film type, sensitivity, frame number and the like.

Provided between magnetic heads 42 and the mask 40 in the carrier 30 is a code reader 44 for optically reading the bar codes. The code reader for reading such bar codes recorded on the films is provided not only in the carrier 30 for the APS but also in conventional (film) carriers.

Figure 2B:
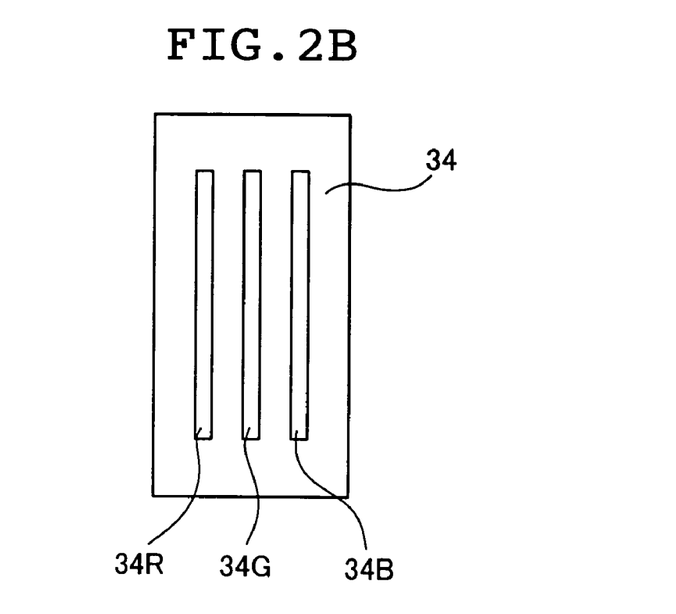
FIG. 2B is a conceptual view of an image sensor in the photoprinter shown in FIG. 1.

As already mentioned, the reading light passes through the film F held on the carrier 30 and the resulting image bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading an R image, a line CCD sensor 34G for reading a G image, and a line CCD sensor 34B for reading a B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with the amplifier 36, converted to digital form in the A/D converter 38 and sent to the image processing apparatus 14.

In the scanner 12, the images recorded on the film F are captured by two scans, the first being prescan at low resolution and the second being fine scan for obtaining output image data. Prescan is performed under preset reading conditions for prescan so that the image sensor 34 can read all images on the film to be processed with the scanner 12 without being saturated. Fine scan is performed under reading conditions for fine scan that were set from the prescanned data for each frame such that the image sensor 34 is saturated at a slightly lower density than the minimum density of the image (frame) of interest.

The output signals for prescan and fine scan are essentially the same data except for resolution and output level.

The scanner 12 as a component of the photoprinter to which the image processing apparatus of the invention is applied is by no means limited to a type that relies upon the slit scan technique described above, but may be of a type that relies upon areal exposure, or a technique by which the image in one frame is scanned across at a time. In this alternative approach, an area CCD sensor may be used with a device for inserting R, G and B color filters between the light source 22 and the film F. Image reading or capturing with the area CCD sensor is successively performed with the R, G and B color filters being sequentially inserted to separate the image recorded on the film into three primary colors.

According to the image processing apparatus of the invention, the image data supply source 21 serving as the image input unit used in the present invention is not limited to the scanner 12 for reading the film as in the illustrated case, and may be substituted by a scanner (not shown) for reading reflection originals; imaging devices such as a digital camera and a digital video camera, and connecting devices thereof; communication devices for connecting to communication lines such as Internet and a local area network; and image data recording media including a magnetic recording medium such as an FD, an optical recording medium such as a CD-ROM and a magneto-optical recording medium such as an MO disk as well as drivers thereof (devices for recording (or writing) and reading out the media). We now describe as a typical example the image processing apparatus of the invention that employs the scanner 12 as an image data supply source.

As already mentioned, the digital signals output from the scanner 12 (image data supplied from the image data supply source) are fed into the image processing apparatus 14.

Figure 3:
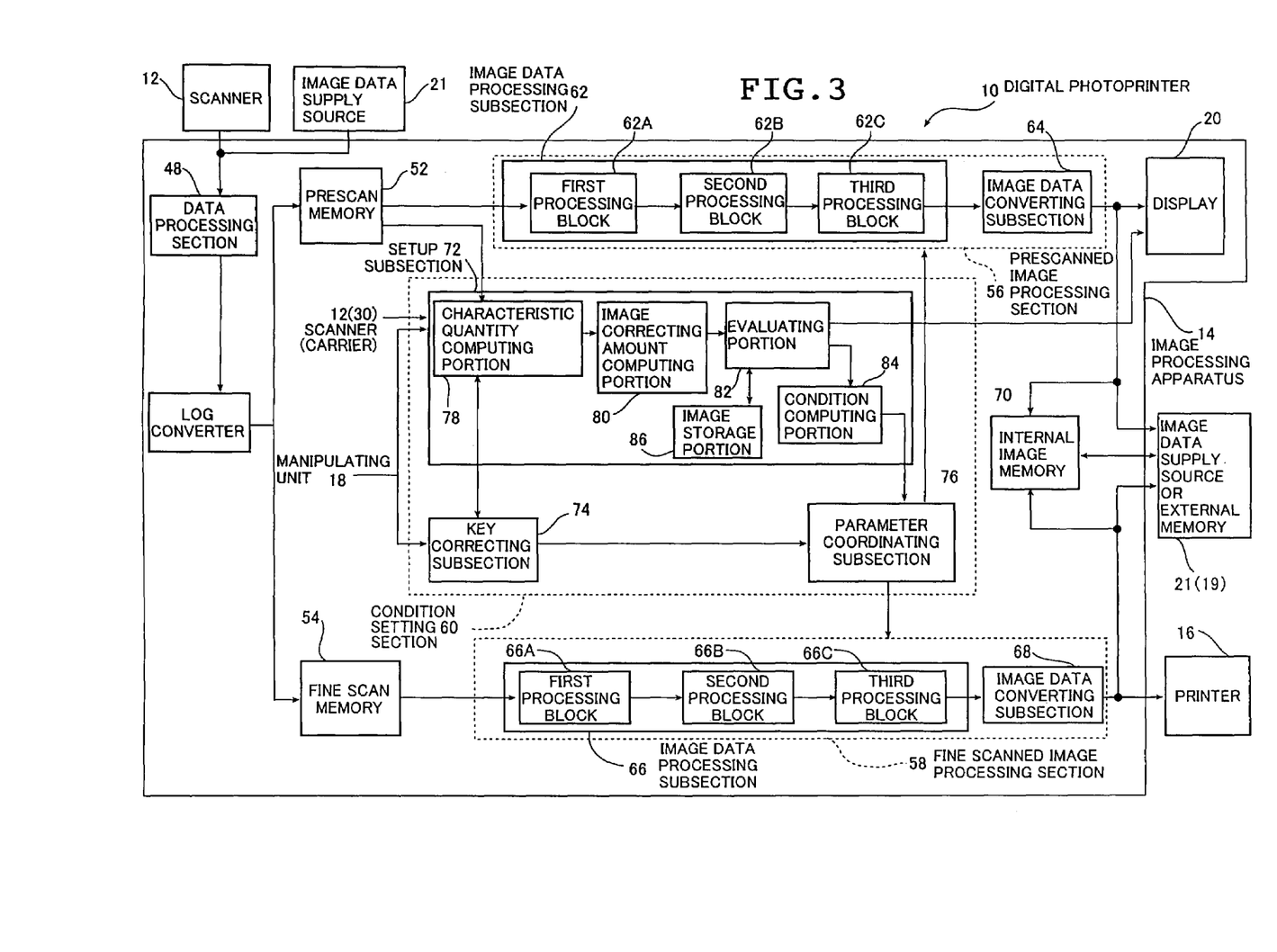
FIG. 3 is a block diagram showing the layout of an embodiment of the image processing apparatus of the invention which is applied to the photoprinter shown in FIG. 1.

FIG. 3 is a block diagram of the image processing apparatus 14, which comprises a data processing section 48, a log converter 50, a prescan (frame) memory 52, a fine scan (frame) memory 54, a prescanned image processing section 56, a fine scanned image processing section 58, a condition setting section 60 and the display 20.

FIG. 3 shows only the sites related to image processing and besides these sites, the image processing apparatus 14 includes a CPU for controlling and managing the overall operation of the photoprinter 10 including the processing apparatus 14, memories for storing the information necessary for the operation and otherwise of the photoprinter 10. The manipulating unit 18 and the display 20 are connected to related sites via the CPU and the like (CPU bus).

The R, G and B digital signals output from the scanner 12 are sent to the data processing section 48, where they are subjected to specified data processing steps such as dark correction, defective pixel correction and shading correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read out into the prescanned image processing section 56 having an image data processing subsection (hereinafter referred to simply as "processing subsection") 62 and an image data converting subsection 64 whereas the fine scanned data stored in the fine scan memory 54 is read out into the fine scanned image processing section 58 having an image data processing subsection (hereinafter referred to simply as "processing subsection") 66 and an image data converting subsection 68.

The processing subsection 62 in the prescanned image processing section 56 and the processing subsection 66 in the fine scanned image processing section 58 are the sites where the image (image data) captured with the scanner 12 is subjected to specified image processing steps in accordance with the processing conditions that are set by means of the condition setting section 60 to be described later in this specification. The image processing steps to be performed in the two processing subsections 62 and 66 are basically the same except the resolution. Then, the processing subsection 66 is described below as the representative of the two subsections.

The processing subsection 66 (or 62) basically comprises a first processing block 66A (or 62A), a second processing block 66B (or 62B) and a third processing block 66c (or 62C).

The first processing block 66A (or 62A) is a site where gray balance adjustment, gradation correction and density (brightness) adjustment are performed. The respective processing steps are performed using look-up tables (LUTs) for adjustment or correction, preferably by sequentially processing the image data with the cascaded LUTs.

The second processing block 66B (or 62B) is a site where image chroma adjustment (color adjustment) including the correction dependent on the type of the light source used as in photography with an electronic flash or under a fluorescent lamp is performed with matrix (MTX) operations in accordance with the image processing conditions that are set by the condition setting section 60 based on the proper amount of the image correction determined in the present invention.

The third processing block 66C (or 62C) is a site where the other processing steps such as electronic magnification, dodging (compression/expansion of the density's dynamic range) and sharpening are performed. These respective processing steps are performed by any known methods by means of averaging, interpolation and the like, using low pass filters, adders, LUTs and MTXs.

The image processing conditions in these respective processing blocks are set in the condition setting section 60 to be described below.

The image data converting subsection 68 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 optionally thins out the image data processed by the processing subsection 62 and similarly converts the image data with a 3D-LUT or the like into image data that corresponds to the representation on the display 20 and which is subsequently displayed on the display 20.

The conditions for the processing to be done in the two image data converting subsections 64 and 68 are set in the condition setting section 60 which is described later.

In the image processing apparatus 14, the image data supply source 21 as mentioned above, in particular communication units and medium drivers also function as the device for outputting the image data processed in the processing subsections 66 and 62, respectively, to external units (external recording units and display units) and external media (image data recording media). Then, it is preferable that the image data converting subsections 68 and 64 function as a portion to convert to image data adapted for the external units and external medium.

The image processing apparatus 14 may also have an internal image memory 70 or be selectively connected to an external memory 19 to store the image data processed in the processing subsections 66 and 62 and then converted in the image data converting subsections 68 and 64, respectively. Then, the image processing apparatus 14 may optionally read out the processed image data from the internal image memory 70 or the external memory 19 for outputting appropriate processed image data without performing image processing, to the display 20 for representation, to the printer 16 for print output, or to an external unit or medium.

The condition setting section 60 implements the image processing method of the invention, determines the image processing steps to be done in the prescanned image processing section 56 and the fine scanned image processing section 58 and sets the conditions thereof. The condition setting section 60 comprises a setup subsection 72, a key correcting subsection 74 and a parameter coordinating subsection 76. Using the prescanned data or the like, the setup subsection 72 computes the amount of image correction and performs automatic determination as to whether the image of interest is a failure image or not, and then supplies the result to the display 20 for monitoring, which is the characteristic operation of the invention. The setup subsection 72 also sets the reading conditions for fine scan and supplies them to the scanner 12; in addition, the setup subsection 72 constructs (or computes) the conditions for the image processing steps to be done in the prescanned image processing section 56 and the fine scanned image processing section 58 and supplies them to the parameter coordinating subsection 76.

Specifically, the setup subsection 72 comprises a characteristic quantity computing portion 78 that reads the prescanned data from the prescan memory 52 and uses it to perform various operations including the construction of density histograms and computing of various image characteristic quantities such as average density, highlights (minimum density) and shadows (maximum density), thereby determining the reading conditions for fine scan; an image correcting amount computing portion 80 that computes a proper amount of image correction using the result of computing in the characteristic quantity computing portion 78; an evaluating portion 82 that evaluates the image for the proper amount of image correction computed in the image correcting amount computing portion 80; and a condition computing portion 84 that computes the final amount of image correction in accordance with the evaluation in the evaluating portion 82, computes various image processing conditions based on the thus computed amount and finalizes them. The setup subsection 72 may further include an image storage portion 86 that stores the results of evaluation in the evaluating portion 82.

The characteristic quantity computing portion 78 may compute, as required, not only the image characteristic quantities mentioned above, but also conventionally known image characteristic quantities necessary for setup including a LATD large-area transmission density (LATD), a central density and a peripheral density.

The image correcting amount computing portion 80 is a characteristic portion of the invention, and automatically computes a proper amount of image correction that seems to be required for image reproduction, by using the density histograms and image characteristic quantities determined in the characteristic quantity computing portion 78. The amount of image correction is automatically computed in the image correcting amount computing portion 80 even when an operator modifies the direction or size of correction for the amount of image correction, after having judged (verified) the type of the image (scene) being processed, for example the type of the failure, as a result of evaluation in the evaluating portion 82. The image correcting amount computing portion 80 may also be used to compute the final amount of image correction, after the operator verifies again the result of this modification and modifies by means of the key correcting subsection 74.

The evaluating portion 82 is another characteristic portion of the invention, and evaluates the image for the correctness of the proper amount of image correction automatically computed in the image correcting amount computing portion 80 by means of the prescanned data, and the density histograms and image characteristic quantities previously determined in the characteristic quantity computing portion 78.

When the evaluated degree of correctness in the amount of image correction is low, the evaluating portion 82 supplies the resulting data or warning data to the display 20 for displaying the result and/or the warning (or warning by the sound). The image for which the evaluated degree of correctness in the amount of image correction is low in the invention is an image of a type which is likely to be erroneously identified in the image processing function having average performance, that is, a failure image. The evaluating portion 82 makes the image identified as the failure image display as such on the display 20 in order to rely on the operator's judgment (verification) for the type of the failure image. The failure images evaluated in the evaluating portion 82 may be successively stored in the image storage portion 86 together with the results of evaluation. A batch of failure images may be subjected to the verification (judgment) by the operator.

On the other hand, when the evaluated degree of correctness in the amount of image correction is not low, that is, when the image of interest is not a failure image, the evaluating portion 82 sends the result to the condition computing portion 84, where computing of the final amount of image correction is started.

When the image evaluated in the evaluating portion 82 is not a failure image, or after the operator ends the additional verification performed after the end of input of the result of judgment (or verification) for failure image, the condition computing portion 84 finalizes the final amount of image correction and sets the image processing conditions. Namely, The final amount of image correction is computed not only in accordance with the density histograms and the image characteristic quantities, but also in response to commands optionally entered by the operator via the key correcting subsection 74 and the manipulating unit 18. The condition computing portion 84 constructs LUTs for gray balance adjustment, gradation correction and density adjustment and MTX arithmetic expressions, and computes coefficients for sharpness correction, thus setting the conditions for various image processing steps to be done in the prescanned image processing section 56 and the fine scanned image processing section 58.

The key correcting subsection 74 computes the amounts of adjustment of image processing conditions (e.g. the amount of correction of LUTs) in accordance with various commands entered by means of correcting keys for adjusting the density (brightness), color, contrast, sharpness, saturation and so forth that have been set in the keyboard 18a or by the mouse 18b; the key correcting subsection 74 then supplies the computed amounts of adjustment into the parameter coordinating subsection 76.

After receiving LUTs, MTX arithmetic expressions and other image processing conditions that have been set by the setup subsection 72, the parameter coordinating subsection 76 sets them in the prescanned image processing section 56 and the fine scanned image processing section 58. Further, in accordance with the amounts of adjustment computed by the key correcting subsection 74, the parameter coordinating subsection 76 either corrects (adjusts) the image processing conditions set in various parts or makes another setting of image processing conditions. It should be noted here that the evaluating portion 82 mentioned above may be provided in the parameter coordinating subsection 76 or that the final amount of correction after the verification is performed may be computed not in the condition computing portion 84 of the setup subsection 72 but in the parameter coordinating subsection 76.

The structures of the image processing apparatus of the invention and the print system to which this apparatus is applied are basically described above. We now describe the image processing method of the invention in greater detail by explaining the operations of the scanner 12, the image processing apparatus 14 and the print system 10.

When requested to prepare prints for the film F mentioned above, the operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value of the variable diaphragm 24 in the scanner 12 and the storage time of the image sensor (line CCD sensors) 34 are set in accordance with the reading conditions for prescan; thereafter, the carrier 30 draws the film F from the cartridge and transports it in the auxiliary scanning direction at a speed adapted for prescan to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic heads 42 read the magnetic information recorded on the magnetic recording media S and the code reader 44 reads the DX code or other bar codes, whereupon the necessary information is sent to a specified site.

In the embodiment under consideration, prescan and fine scan may be both performed frame by frame. Alternatively, all frames or frame groups each consisting of a given number of frames may successively be subjected to prescan and fine scan. On the pages that follow, the case of reading the image in one frame is described for the sake of simplicity.

The output signals from the image sensor 34 obtained by prescan are amplified by the amplifier 36 and sent to the A/D converter 38, where they are converted to digital form. The digital signals are sent to the image processing apparatus 14, where they are given specified data processing steps in the data processing section 48 and converted in the log converter 50 to prescanned data (digital image data), which is then stored in the prescan memory 52.

When the setup subsection 72 in the condition setting section 60 reads the prescanned data stored in the prescan memory 52, the characteristic quantity computing portion 78 constructs the density histograms, computes the image characteristic quantities such as highlights and shadows, sets the reading conditions for fine scan of each frame and further extracts the frame position of each frame. Then, the evaluating portion 82 evaluates the image for the amount of image correction, that is, evaluates (judges) as to whether the image being processed is a failure image or not. If the image of interest is not a failure image, the condition computing portion 84 performs, based on the proper amount of image correction, construction of gradation adjustment table and gray balance adjustment table, construction of MTX operations for chroma correction and supplies them to the parameter coordinating subsection 76.

When the image evaluated in the evaluating portion 82 is a failure image, and when the amount of image correction automatically computed in the image correcting amount computing portion 80 is not appropriate as a result of evaluation, the evaluating portion 82 gives a warning and displays the image of interest on the display 20 for monitoring to wait for the operator's judgment. The operator selects or enters (for verification) modification of the direction and size of correction in accordance with the type of the failure image by means of the keyboard 18a and the mouse 18b (GUI) or the correcting keys. As a result, the setup subsection 72 adds the modification to make the proper amount of image correction compute in the image correcting amount computing portion 80. The thus computed amount is used to display the corrected image on the display 20 for monitoring.

Thereafter, as mentioned below, the operator performs an additional verification, and if the image is appropriate, the final amount of image correction is computed, and the condition computing portion 84 computes the image processing conditions and supplies them to the parameter coordinating subsection 76. It should be noted that, if the image is not appropriate as a result of verification by the operator, the modification mentioned above is repeatedly performed until the image passes the verification.

Upon receiving the image processing conditions, the parameter coordinating subsection 76 subsequently sets them at a specified site (hardware) in the prescanned image processing section 56 and the fine scanned image processing section 58.

When the operator verifies the image displayed on the display 20, the prescanned data is read out of the prescan memory 52 by the processing subsection 62 and processed in the respective processing blocks 62A–62C in the processing subsection 62. Then, the processed data is converted in the image data converting subsection 64 and represented on the display 20 as a simulation image. Looking at the simulation image being represented on the display 20, the operator performs verification of the image or processing results, and as required, performs color, density or gradation adjustment using adjustment keys on the keyboard 18a.

The thus entered command for adjustment is sent to the key correcting subsection 74, where the amounts for correcting the image processing conditions are computed in accordance with various commands entered for adjustment. The computed amounts are then sent to the parameter coordinating subsection 76, where the LUTs and MTXs in the image processing subsections 62, 66 are corrected in accordance with the supplied amounts for correction, as described above. The image to be represented on the display 20 also varies in accordance with this correction or the command entered for adjustment by the operator.

If the operator finds that the image in the frame of interest is appropriate (the result of the verification is OK), he or she gives a command for print start using the keyboard 18a or the mouse 18b. Thus, the image processing conditions are finalized, the stop-down value of the variable diaphragm 24 in the scanner 12 is set in accordance with the previously set reading conditions for fine scan, and the carrier 30 starts to transport the film F at a speed adapted for fine scan, whereby fine scan of this frame is started.

If no verification is to be performed, the image processing conditions are finalized at the point of time when the parameter coordinating subsection 76 ends setting of the image processing conditions in the processing subsection 66 of the fine scanned image processing section 58. Thus, fine scan is started.

Fine scan is performed in the same manner as prescan except that the reading conditions such as the stop-down value of the variable diaphragm 24 are used as the reading conditions for fine scan. The output signals from the image sensor 34 are amplified with the amplifier 36, converted to digital form in the A/D converter 38 and processed in the data processing section 48 of the image processing apparatus 14. Thereafter, the processed digital signals are converted to fine scanned data in the log converter 50, and sent to the fine scan memory 54.

When the fine scanned data is sent to the fine scan memory 54, the image data is read out by the fine scanned image processing section 58 and processed in the respective processing blocks 66A–66C in the processing subsection 66 under the established image processing conditions. Then, the processed image data is converted in the image data converting subsection 68 into output image data, which is then output into the printer 16.

The printer 16 comprises an exposing apparatus in which a light-sensitive material (photographic paper) is exposed in accordance with the supplied image data to record a latent image and a processor (developing apparatus) in which the exposed light-sensitive material is subjected to development and other specified processing to output a (finished) print.

To give one example of the printer's operation, the light-sensitive material is cut to a specified length in accordance with the size of the final print; thereafter, the printer records a back print and three light beams for exposure to R, G and B in accordance with the spectral sensitivity characteristics of the light-sensitive material are modulated in accordance with the image data output from the processing apparatus 14; the three modulated light beams are deflected in the main scanning direction while, at the same time, the light-sensitive material is transported in the auxiliary scanning direction perpendicular to the main scanning direction so as to record a latent image thereon by two-dimensional scan exposure with the light beams; the latent image bearing light-sensitive material is supplied to the processor, where it is subjected to a wet development process comprising color development, bleach-fixing and rinsing, then dried to produce a print; the thus produced prints of a specified unit number for example corresponding to a film roll are sorted and stacked.

Figure 4:
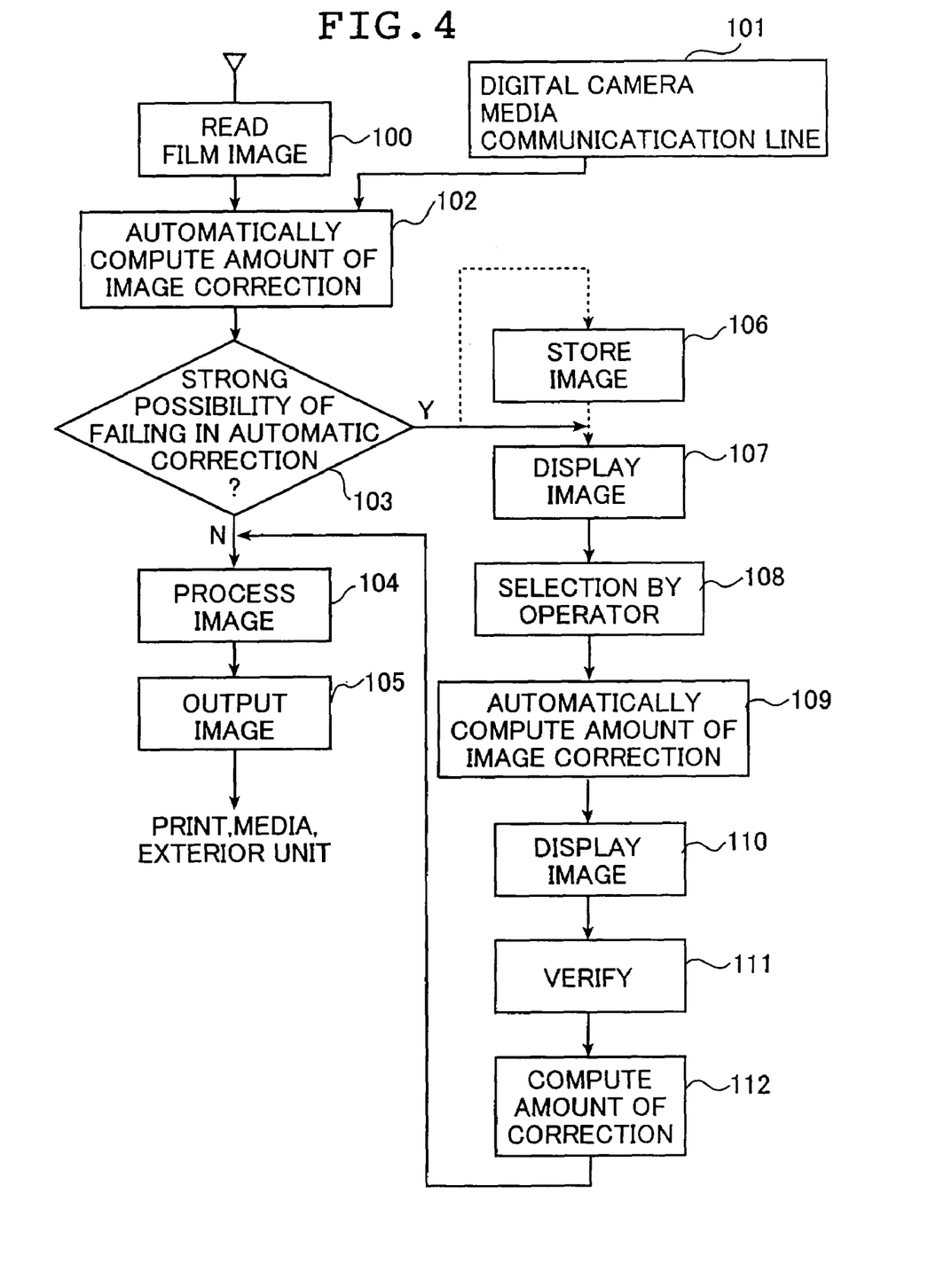
FIG. 4 is a flowchart for illustrating an example of the operation of the photoprinter to which the image processing method according to an embodiment of the invention is applied.

We now describe the characteristic operation of the image processing method of the invention with reference to FIG. 4, which is a flowchart for illustrating the operation of the photoprinter in which the image processing method of the invention is implemented.

As mentioned above, the characteristic operation of the image processing method of the invention is that the frame containing an image (failure image) having a strong possibility of failing in computing the proper amount of correction in the image correcting amount computing portion 80 of the setup subsection 72 is subjected to the verification by the operator.

We now describe this point in detail based on the flowchart shown in FIG. 4.

The scanner 12 reads the film image to obtain image data in step 100. At that time, image data may be read in step 101 from the image data supply source 21 such as an image data recording medium (e.g. digital camera) or via communication lines. In the setup subsection 72 of the condition setting section 60 in the image processing apparatus 14 that has read the image data, the characteristic amount computing portion 78 of the setup subsection 72 performs various processing including construction of histograms and computing of various image characteristic quantities, after which the image correcting amount computing portion 80 automatically computes the amount of image correction in step 102. Thereafter, the evaluating portion 82 evaluates the image of interest in step 103 as to whether this image is a failure image or not. That is, the evaluating portion 82 evaluates this image and judges as to whether there is a possibility of failing in automatic correction. When the predetermined failure image is not detected at that time (No in step 103), the processing subsection 66 performs image processing under the image processing conditions computed in the condition computing portion 84 based on the automatically computed amount of image correction (step 104). Outputting to the printer 16, outputting to an external medium or unit via the image data supply source 21 and storage into the internal memory 70 or external memory 19 are performed (step 105).

The method of evaluating for the correctness in the amount of image correction or detecting the failure image in the evaluating portion 82 is not limited in any particular way, but any known methods can be used. That is, detection of the failure image does not require any special algorithm, but various common algorithms can be used. For example, the technique disclosed in Japanese Examined Patent Publication No. 3-81141 can be advantageously used for detecting on an original image taken under artificial lighting such as a fluorescent lamp, a tungsten lamp or the like. Further, a method of comparing the density difference between the principal subject and the other region with the threshold can be used for detecting on an original image of a person taken with backlight or an electronic flash.

The technique disclosed in Japanese Examined Patent Publication No. 3-81141 (supra) is as follows: an original image is divided into a multiplicity of fine portions, which are subjected to photometry to separate into three colors, the maximum density values of which are determined respectively. The maximum density values are computed for individual original images of one film roll. Thus, the maximum density values of the original images of one film roll or a plurality of successive original images of which the maximum density values are within a specified range are obtained for each color. The average values obtained from the maximum density values are used as the characteristic values for identifying abnormal image. When the difference between the average color determined by the three characteristic values and a neutral color exceeds a specified value, a plurality of images used in computing the characteristic values for identifying abnormal image are identified as an abnormal original image that was taken under artificial lighting such as a fluorescent lamp, a tungsten lamp or the like.

On the other hand, when the judgment in the evaluating portion 80 is Yes, namely, when the predetermined failure image is detected (step 103), the result and/or the warning and further the image are represented on the display 20 for monitoring (step 107) to wait for the judgement by the operator. The judgement may be awaited for each frame, but a plurality of frames may be represented on the display 20 and subjected to the operator's judgment on a suitable unit basis. The unit such as one negative film roll or one request for negative film printing can be appropriately determined in accordance with the size of the processing laboratory.

The operator detects or verifies the failure image (step 108) and need only judge (verify) the failure image, which is different from the usual verification or so-called frame verification. Specifically, the operator simply selects one of the images belonging to a group in which images are corrected in different directions, that is, one of the image taken under a light source of an unusual type such as a fluorescent lamp or a tungsten lamp and the image having a color failure or one of the image taken with backlight and the image taken with an electronic flash. The keyboard 18a and the mouse 18b of the manipulating unit 18 and the correcting keys can be employed for selection. When an instruction for selection is entered (for verification), the setup subsection 72 transfers the information via the characteristic quantity computing portion 78 to the image correcting amount computing portion 80, which automatically computes the amount of image correction based on the instructed information (step 109).

The image based on the result of correction delivered from the evaluating portion 82 is displayed again on the display 20 (step 110). The operator may optionally verify the displayed image (step 111) and subject this image to manual correction. In this case, the final amount of image correction in which the entered modification is taken into consideration is computed (step 112) and is then reflected on the image processing to be performed (step 104). Thereafter, as mentioned above, a print reproducing the image or image data is output (step 105).

It should be noted here that the processing in step 112 is computing of the amount of correction with respect to the result of a usual verification (so-called frame verification).

When images evaluated in the evaluating portion 82 are failure images, these images are not immediately subjected to the operator's verification, but are stored successively in the image storage portion 86. In view of the efficiency of image processing, it is preferred that a batch of the failure images stored in the image storage portion 86 is subjected to the operator's verification. When the failure images are thus stored in the image storage portion 86, step 106 may be inserted for example after step 103 so that the failure images can be stored.

When the image evaluated in the evaluating portion 82 is not a failure image, this image is not preferably displayed on the verification screen of the display 20.

When the operator selects or designates the type of the failure image (step 108), the following process is preferably performed: two or more correcting directions that are different from the desired correcting direction are made selectable, and a proper amount of image correction is automatically computed for each selected direction (step 109). The image resulting from the image processing based on the computed proper amount of image correction is corrected for the plurality of correcting directions, and the corrected images are displayed to rely on the operator's instruction for selection (step 110).

While the image processing apparatus and method of the present invention have been described above in detail, it should be noted that the invention is by no means limited to the foregoing embodiments and various improvements and design modifications may of course be made without departing from the scope and spirit of the invention.

As described above in detail, the present invention has a marked effect that images having a possibility of being erroneously identified during image processing are subjected to operator's judgment whereby the image processing apparatus capable of reducing the number of defective prints can be obtained.

What is claimed is:

1. An image processing apparatus, comprising:
an image correcting amount computing unit for computing a proper amount of image correction based on image data of an image of an original delivered from an image input unit by which the image data of the image of the original was input;
an image processing unit for performing image processing based on the proper amount of image correction computed by said image correcting amount computing unit to thereby produce a processed image; and
a display unit for displaying for monitoring the processed image obtained by said image processing unit;
wherein the proper amount of image correction automatically computed by said image correcting amount computing unit is evaluated for a degree of correctness and a warning is given when said degree of correctness is low;
wherein the evaluation for the degree of correctness is performed prior to the image processing.

2. The image processing apparatus according to claim 1, wherein said image input unit is an image reading unit for photoelectrically reading the image of said original as said image data, a readout unit for reading out said image data from a digital camera or an image data recording medium, or a communication unit for downloading said image data via communication lines.

3. The image processing apparatus according to claim 1, wherein an image for which the warning is given because of the low degree of correctness in the proper amount of image correction automatically computed by said image correcting amount computing unit, belongs to a group of images in which correction is performed in different directions for said proper amount of image correction, said image processing apparatus further including:
a verification unit in which an operator performs an input operation for verifying said image belonging to the group of the images in which the correction is performed in the different directions for the proper amount of image correction.

4. The image processing apparatus according to claim 3, wherein the image for which the correction is performed in the different directions for the proper amount of image correction is a failure image and the group of the images in which the correction is performed in the different directions for the proper amount of image correction is a group that contains images taken with unusual types of light sources and images having a color failure, and a group that contains images taken with backlight and images taken with an electronic flash.

5. The image processing apparatus according to claim 4, wherein images other than said failure image are not displayed on a verification screen in said display unit.

6. The image processing apparatus according to claim 4, wherein, for said failure image, each image resulting from said image processing performed based on said proper amount of image correction in each of at least two of said different directions is displayed on the display unit to ask for the operator's instruction for selection.

7. The image processing apparatus according to claim 4, further including:
an image storage unit for storing failure images, so that a batch of said failure images can be verified.

8. The image processing apparatus according to claim 3, wherein, for the image for which the warning is given because of the low degree of correctness in the proper amount of image correction, each image resulting from said image processing performed based on said proper amount of image correction in each of at least two of said different directions is displayed on the display unit to ask for the operator's instruction for selection.

9. The image processing apparatus according to claim 1, wherein images other than the image for which the warning is given because of the low degree of correctness in the proper amount of image correction are not displayed on a verification screen in said display unit.

10. The image processing apparatus according to claim 1, further including:
an image storage unit for storing images for which the warning is given because of the low degree of correctness in the proper amount of image correction, so that a batch of the images for which the warning is given because of the low degree of correctness in the proper amount of image correction can be verified.

11. The image processing apparatus according to claim 1, further including:
a unit for storing the processed image obtained by said image processing unit as the image data.

12. The image processing apparatus according to claim 1, further including:

a unit for outputting the processed image obtained by said image processing unit to an external unit as the image data.

13. The image processing apparatus according to claim 1 further comprising a characteristic quantity computing portion for reading prescan data of the image to generate said image data, wherein the said image data is used to compute the proper amount of image correction.

14. The image processing apparatus according to claim 13, wherein the image data includes at least one of density histogram, average density, minimum density, maximum density, large-area transmission density, central density, and peripheral density.

15. The image processing apparatus according to claim 1, wherein the image data includes at least one of density histogram, average density, minimum density, maximum density, large-area transmission density, central density, and peripheral density.

16. The image processing apparatus according to claim 1, wherein the proper amount of image correction is evaluated based on the image data of the image of the original.

17. An image processing method, comprising the steps of:
computing a proper amount of image correction based on image data of an image of an original input by photoelectrically reading the image of said original, reading out from a digital camera or an image data recording medium, or downloading via communication lines;
performing image processing based on the thus computed proper amount of image correction; and
outputting a processed image based on results of the image processing;
wherein the proper amount of image correction automatically computed in the step of computing the proper amount of image correction is evaluated for a degree of correctness and a warning is given when said degree of correctness is low;
wherein the evaluation is performed prior to the image processing.

18. The image processing method of claim 17 further comprising:
reading prescan data of the image; and
generating image data from the prescan data, wherein the image data is used to compute the proper amount of image correction.

19. The image processing method apparatus according to claim 17, wherein the image data includes at least one of density histogram, average density, minimum density, maximum density, large-area transmission density, central density, and peripheral density.

20. The image processing method according to claim 17, wherein the proper amount of image correction is evaluated based on the image data of the image of the original.

21. An image processing apparatus, comprising:
an image correcting amount computing unit for computing a proper amount of image correction based on image data of an image of an original delivered from an image input unit by which the image data of the image of the original was input by photoelectrically reading the image of the original, or reading out from a digital camera or an image data recording medium, or downloading via communication lines;
an image processing unit for performing image processing based on the proper amount of image correction computed by said image correcting amount computing unit to thereby produce a processed image;
a display unit for displaying for monitoring the processed image obtained by said image processing unit; and a verifying unit in which an operator performs an input operation for verifying an image belonging to a group of images in which correction is performed in different directions for said proper amount of image correction automatically computed by said image correcting amount computing unit;

wherein the input operation for verifying the image is performed by the operator prior to the image processing, and the image for which the correction is performed in the different directions for the proper amount of image correction is a failure image and the group of the images in which the correction is performed in the different directions for the proper amount of image correction is a group that contains images taken with unusual types of light sources and images having a color failure, and a group that contains images taken with backlight and images taken with an electronic flash.

* * * * *